United States Patent [19]

Huang

[11] Patent Number: 5,396,809
[45] Date of Patent: Mar. 14, 1995

[54] FLOW METER HAVING A FLUIDIC OSCILLATOR

[75] Inventor: Bao T. Huang, Antony, France

[73] Assignee: Schlumberger Industries, S.A., Montrouge, France

[21] Appl. No.: 174,105

[22] Filed: Dec. 28, 1993

[51] Int. Cl.⁶ .............................................. G01F 1/20
[52] U.S. Cl. ..................................... 73/861.19
[58] Field of Search ..................... 73/861.18, 861.19

[56] References Cited

U.S. PATENT DOCUMENTS 4,244,230  1/1981  Bauer ................. 73/861.19

FOREIGN PATENT DOCUMENTS 295623  12/1988  European Pat. Off. .
2326685  4/1977  France .
2663416  12/1991  France .

*Primary Examiner*—Herbert Goldstein
*Attorney, Agent, or Firm*—Sanford J. Asman

[57] ABSTRACT

A fluidic oscillator flowmeter in which a two-dimensional fluid jet oscillating transfersely relative to a plane of symmetry, P, sweeps over the bottom of a cavity, and in which the flow rate is determined by electronic means from a signal, S, corresponding to a differential pressure resulting from the difference between a pressure tapped off at a point, $P_3$, located on the axis of intersection between the plane of symmetry, S, and the bottom of the cavity and a pressure resulting from tapping off the pressure at two points, $P_1$ and $P_2$, which are located symmetrically on respective sides of the plane of symmetry, S.

3 Claims, 3 Drawing Sheets

FLOW METER HAVING A FLUIDIC OSCILLATOR

The present invention relates to a fluidic oscillator enabling the flow rate of a flowing liquid or gaseous fluid to be measured.

BACKGROUND OF THE INVENTION

U.S. Pat. No. 4,244,230 describes a fluidic oscillator flowmeter that is symmetrical about a plane of symmetry. The flowmeter has an inlet in the form of a nozzle feeding a two-dimensional fluid jet into a chamber. Inside the chamber an obstacle has a frontal cavity located in the path of the jet. The oscillation of the jet is transverse relative to the plane of symmetry of the flowmeter, and is accompanied by the formation in the cavity of two vortices, one on either side of the jet. Each vortex is alternately strong and weak, out of phase with the other vortex. During the oscillation the point of impact of the jet sweeps over the wall of the cavity.

Two pressure tappings located on respective sides of the plane of symmetry are connected to one or more pressure sensors in such a manner as to measure the frequency of the oscillation of the jet in the cavity. FIG. 1 shows schematically the electric signal provided by a pressure sensor measuring the difference in pressure between the two pressure tapping points as a function of time t.

Each extreme value has a double peak. The deepest point of the trough located between the two peaks corresponds to the point of impact of the jet passing through its point of maximum deviation.

Thus, if we consider a jet sweeping the cavity, away from the plane of symmetry after passing the region of a pressure tapping, the jet continues its course towards the point of maximum deviation.

After reaching a maximum, the pressure measured at the point of the pressure tapping reduces. On reaching its point of maximum deviation (the bottom of the trough between the peaks), the jet returns towards the plane of symmetry, approaching the pressure tapping, (the second peak corresponds to the passage of the jet through the location of the pressure tapping), then passes through towards the opposite pressure tapping.

On exceeding a suitable selected threshold, the signal S is transformed into square waves by a suitable electronic system. Each square wave corresponds to a volume of fluid which has passed through the flowmeter. The flow can thus be determined by counting the square waves.

The accuracy of such a measurement is equal to one half an oscillation period.

Thus, when the fluid flow is interrupted, at the moment when the oscillation ceases, the exact position of the point of impact of the jet at the bottom of the cavity is unknown, thereby giving rise to uncertainty in the measurement.

OBJECT AND SUMMARY OF THE INVENTION

It is an object of the present invention to improve the accuracy of a flowmeter of the type described above, by a factor of 2 at least, and to do this without increasing the frequency of oscillation of the jet in the cavity.

To do this the present invention proposes placing at least one pressure tapping at a point located on the axis of intersection between the plane of symmetry and the bottom of the cavity, in addition to the symmetrical pressure tappings on respective sides of the plane of symmetry. A the pressure tappings located symmetrically on the respective sides of the plane of symmetry, and (b) the pressure existing in the region of the pressure tapping located on the axis of intersection. The square waves formed from the signal corresponding to the differential pressure occur at a frequency greater than that in the prior art (at twice the frequency at least); each square wave corresponds to a smaller unit of volume flow so that the accuracy of the measurement is improved.

The pressure tappings symmetrical relative to the plane of symmetry are preferably located substantially at the sites of the points of maximum deviation of the point of impact of the jet inside the cavity, within the range of flow rates in question.

BRIEF DESCRIPTION OF THE DRAWINGS

The features of the invention appear better from a reading of the following description, given by way of example and without limitation, and referring to the accompanying drawings, in which.

MORE DETAILED DESCRIPTION

Figure 2:
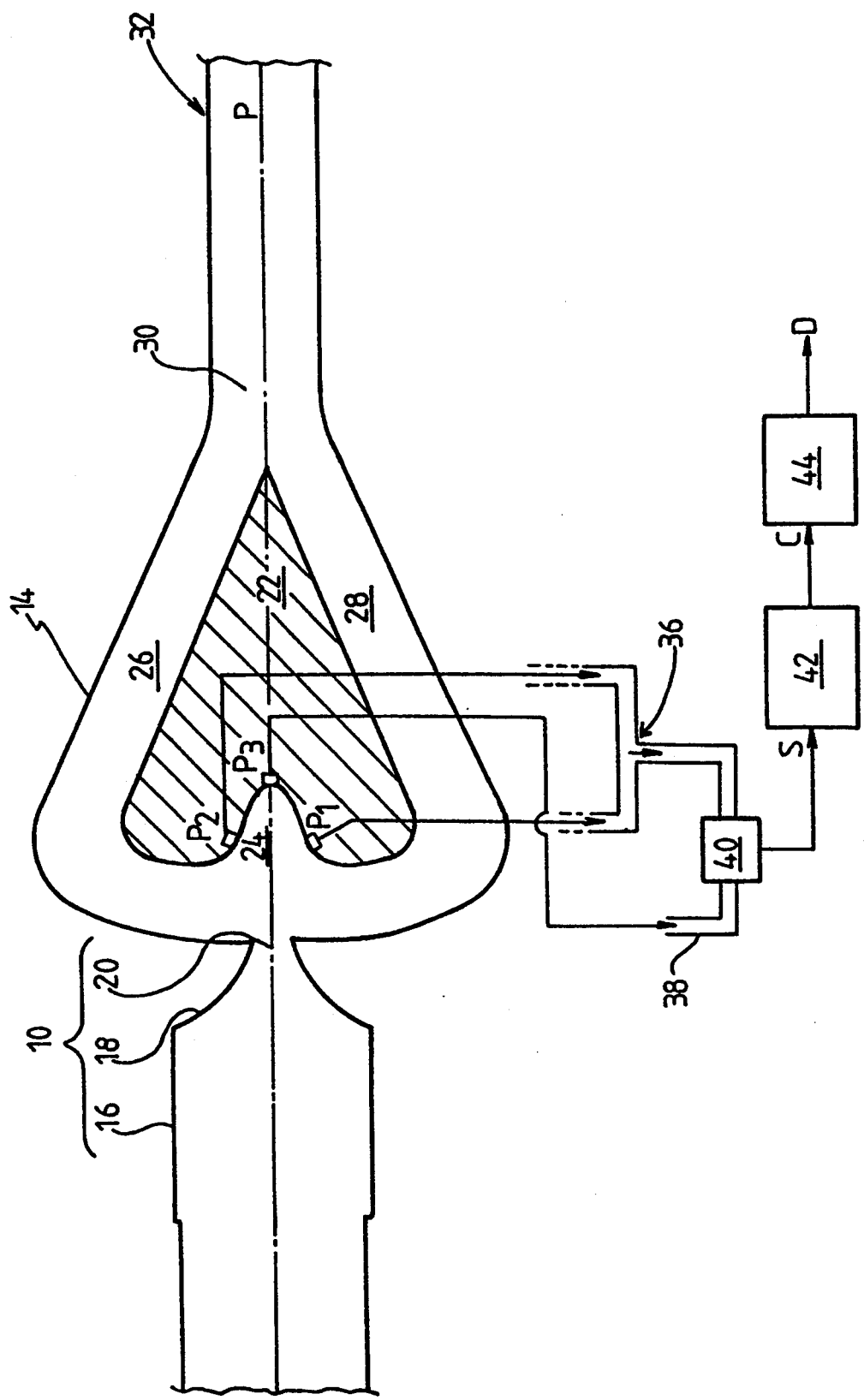
FIG. 2 shows a device in conformity with the invention in a schematic view from above.

Referring to FIG. 2, an embodiment of a device in conformity with the invention is described, applicable equally well to a liquid or a gas. The flowmeter comprises a fluid inlet 10 connected at one end to an inlet duct 12 for the fluid and at its other end to an oscillation chamber 14.

The fluid inlet 10 comprises a parallelepipedal settling chamber 16 which allows transition from a jet of circular transversal cross-section in the duct 12 to a jet of square or rectangular transversal cross-section. The settling chamber ends in a convergent section 18 with an inlet orifice 20. The rectangular inlet orifice is in accordance with the principles of two-dimensionality well known to the person skilled in the art, in such a manner as to feed to the oscillation chamber 14 with a two-dimensional jet oscillating transversely relative to the plane of symmetry P of the flowmeter.

An obstacle 22 is located in the oscillation chamber. A cavity 24 is formed in the front part of the obstacle 22, facing the inlet orifice 20. The fluid jet, having entered the oscillation chamber, sweeps over the walls of the cavity 24 in the course of its oscillation.

The fluid flow leaves by channels 26, 28 formed between the walls of the obstacle 22 and those of the oscillation chamber 14. The flow is directed by the channels towards an outlet orifice 30, connected to a drain duct 32.

The measurement of the flow is effected by detecting the jet sweeping the bottom of the cavity 24 in the course of its oscillation. The frequency of oscillation of the jet is proportional to the flow rate.

Figure 3:
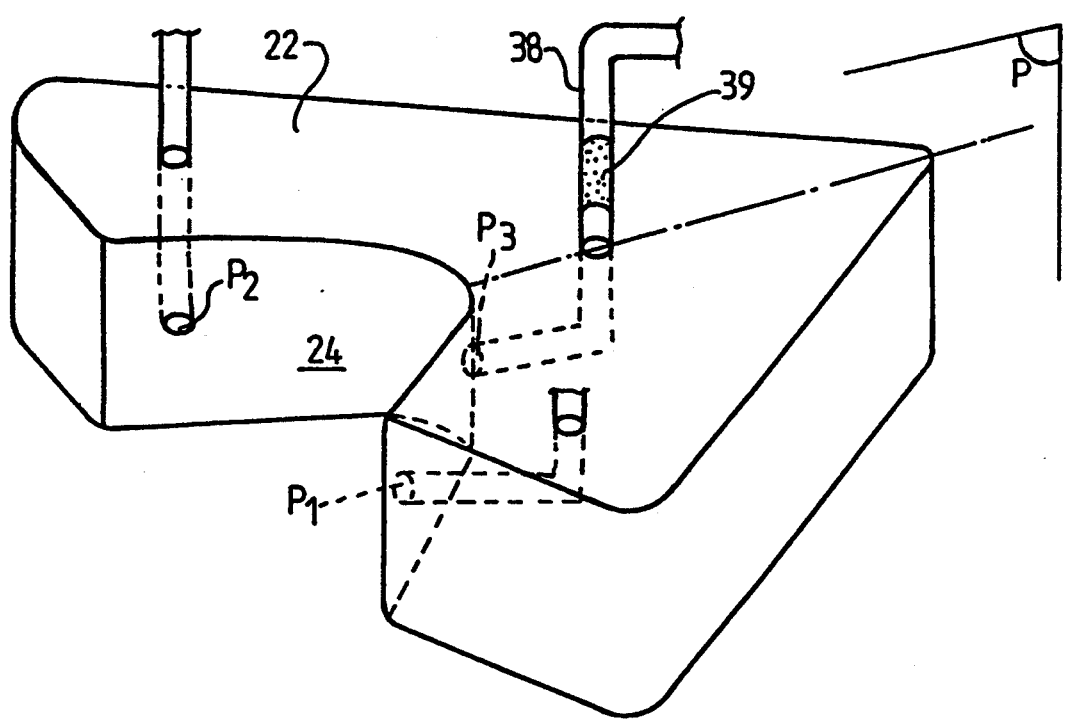
FIG. 3 is a schematic perspective view of an obstacle forming part of a flowmeter in conformity with the invention.

In conformity with the invention, in order to measure the flow rate, the device shown in FIG. 2 includes three pressure tappings P1, P2, P3. As can be seen in FIG. 3 which is a perspective view of the obstacle 22, these pressure tappings are formed by channels passing through the obstacle 22, each opening out at one end in one of three points (P1, P2, P3) in the cavity 24 and at its other end at a respective one of three points located on the top of the obstacle, for example.

The pressure tappings P1 and P2 are located symmetrically on respective opposite sides of the plane of symmetry P, for example half way up the obstacle. The pressure tappings P1 and P2 are advantageously located in the region of the points of maximum deviation of the jet during its oscillation in the cavity.

Figure 1:
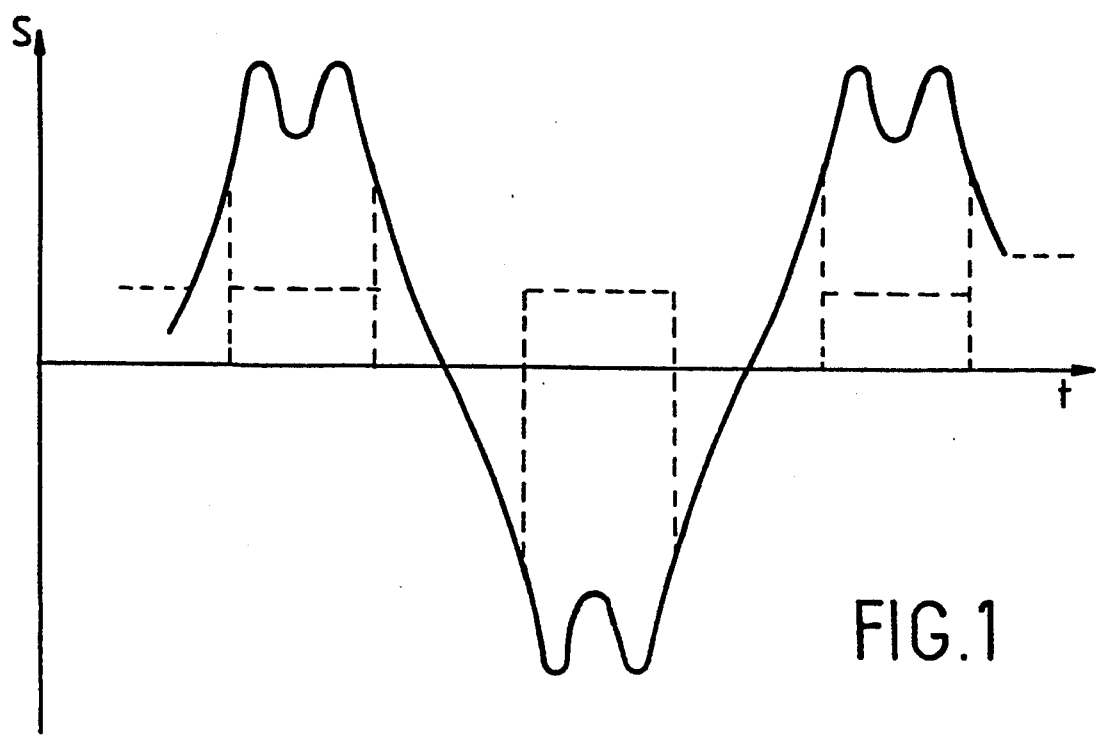
FIG. 1, already described, shows schematically the signal measured by a prior art flowmeter.

It is known that these points of maximum deviation vary slightly with the fluid flow rate. The position of a pressure tapping only corresponds exactly with the point of maximum deviation for a given flow rate. Referring to FIG. 1, the difference between the position of a point of deviation and the position of a pressure tapping gives rise to the trough between two pressure peaks detected as the jet passes over a pressure tapping, in the case in which the jet passes beyond the pressure tapping as it moves away from the plane of symmetry in the course of oscillation. In the case in which the amplitude of the oscillation is not sufficient to pass beyond the positions of the pressure tappings as the jet moves away from the plane of symmetry, this effect is not experienced. The pressure tappings P1 and P2 are thus positioned in such a manner that, within the range of measurement the trough which can form in the signal between two peaks corresponding to successive passages of the jet over a pressure tapping will be neither sufficiently wide nor sufficiently deep to perturb the measurement.

Returning to FIG. 2, it is seen that the pressure tappings P1 and P2 are connected together by a connecting piece 36 in the form of a T.

The pressure tapping P3 is located for example halfway up the obstacle, on the axis of intersection between the plane of symmetry P and the bottom of the cavity 24.

The outlet duct of the connecting piece 36 and the channel 38 connected to the pressure tapping P3 are connected to a pressure sensor 40, for example of silicon and of thermal effect type or any other type of sensor of flow or of pressure. A pressure sensor of the type Validyne DP103 sold by the company Validyne Engineering Corporation may be used for example.

In a modified embodiment, each pressure tapping may be connected to an independent pressure sensor, with suitable processing of the signals provided by these sensors enabling the desired results to be obtained.

The pressure sensor 40 provides an output signal S corresponding to the variations in the pressure difference between the pressure at the point P3 taken as reference value and the resulting pressure between the points P1 and P2 directly obtained at the outlet of the T connector piece 36.

Given that the pressure variations in the region of the point P3 are greater than those which can occur at the region of P1 or P2, a head loss may be introduced in the region of the pressure tapping P3 to compensate at least partially for the effect of these pressure variations. In the example shown in FIG. 3, the head loss is provided by a porous plug 39 located in the channel 38.

The introduction of this head loss makes it possible to avoid asymmetry in the signal S which would lead to a risk of losing the measured frequency.

The output of the pressure cell 40 is connected to the input to an electronic system 42 for transforming the signal S into a sequence of square waves (forming the signal C), occurring on passing a pre-selected threshold.

The square waves thus formed appear at a frequency which is twice that of square waves measured in the prior art. In this manner, each square wave corresponds to a volume of fluid passing through the flowmeter that is lower (by a factor of two) than the volume corresponding to the square waves of the prior art. The counting of the squarewaves is effected by a counter device 44 providing a signal D corresponding to the volume of fluid which has passed through the flowmeter during the time of counting, and thus proportional to the flow rate.

Since the unit volume counted per square wave is less than in the prior art, the accuracy of the measurement is correspondingly increased.

I claim:

1. A fluidic oscillator flowmeter of the two-dimensional fluid jet type with the jet oscillating transversely on either side of a longitudinal plane of symmetry, P, the flowmeter comprising:
   (a) an oscillation chamber;
   (b) an obstacle located in said oscillation chamber and having in its front part a cavity located in the path of the fluid jet, said cavity having walls, such that the fluid jet sweeps over said walls of said cavity during the course of its oscillation;
   (c) two pressure tappings, located, respectively at points $P_1$ and $P_2$, said points being located symmetrically on two respective sides of said plane of symmetry, P;
   (d) means for providing a pressure resulting from tapping off the pressure at said two points $P_1$ and $P_2$;
   (e) a pressure tapping at a point $P_3$ located on the axis of intersection between said plane of symmetry, P, and the bottom of said cavity;
   (f) means for providing a differential pressure which results from the difference between said pressure tapped off at said point, $P_3$, and said pressure resulting from tapping off the pressure at said two points, $P_1$ and $P_2$; and
   (g) means for providing a signal, S, corresponding to said differential pressure; and
   (h) means for determining a fluid flow rate from said differential pressure measurement.

2. The flowmeter of claim 1 in in which said two points, $P_1$ and $P_2$, located symmetrically on the two respective sides of said plane of symmetry, P, are located substantially at the sites of the points of maximum deviation of said fluid jet in said cavity, within the range of flow rates in question.

3. The flowmeter of claim 1 in which a head loss is introduced in the region of the pressure tapping located on the axis of intersection between said plane of symmetry, P, and the bottom of said cavity.

* * * * *